(12) United States Patent
Yang et al.

(10) Patent No.: US 11,991,559 B2
(45) Date of Patent: *May 21, 2024

(54) CONGESTION PROCESSING METHOD AND DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,920

(22) Filed: Jul. 12, 2022

(65) Prior Publication Data
US 2022/0345939 A1    Oct. 27, 2022

Related U.S. Application Data

(63) Continuation of application No. 16/661,587, filed on Oct. 23, 2019, now Pat. No. 11,405,824, which is a
(Continued)

(51) Int. Cl.
*H04W 28/088* (2023.01)
*H04L 41/0816* (2022.01)
(Continued)

(52) U.S. Cl.
CPC ....... *H04W 28/088* (2023.05); *H04L 41/0816* (2013.01); *H04W 28/08* (2013.01);
(Continued)

(58) Field of Classification Search
CPC ..... H04W 28/08; H04W 76/19; H04W 76/15; H04W 76/38; H04L 41/0816
See application file for complete search history.

(56) References Cited

U.S. PATENT DOCUMENTS

| | | | |
|---|---|---|---|
| 2013/0044709 A1* | 2/2013 | Adjakple | H04W 76/15 370/329 |
| 2019/0045482 A1* | 2/2019 | Lee | H04W 76/28 |
| 2019/0320368 A1* | 10/2019 | Li | H04W 36/125 |

FOREIGN PATENT DOCUMENTS

| | | |
|---|---|---|
| CN | 105359581 A | 2/2016 |
| JP | 2016158281 A | 9/2016 |
| WO | 2015002290 A1 | 1/2015 |

OTHER PUBLICATIONS

Notice of Allowance of corresponding Chinese application No. 201780088940.2 dated Aug. 16, 2022.
(Continued)

*Primary Examiner* — Jackie Zuniga Abad

(57) ABSTRACT

The present application provides a congestion processing method and device. The method includes: an access network device receives a first message transmitted by a source core network device, where the first message is used for indicating that the source core network device is overloaded; and the access network device, according to the first message, performs an operation of migrating the terminal device from the source core network device to a target core network device, where the target core network device and the source core network device support different communication systems. The congestion processing method according to the present application can solve the congestion problem of a core network device, realize load balancing between core network devices, and thereby improving user experience.

13 Claims, 7 Drawing Sheets

Related U.S. Application Data continuation of application No. PCT/CN2017/082479, filed on Apr. 28, 2017.

(51) Int. Cl.
*H04W 28/08* (2023.01)
*H04W 76/15* (2018.01)
*H04W 76/19* (2018.01)
*H04W 76/38* (2018.01)

(52) U.S. Cl.
CPC .......... *H04W 76/15* (2018.02); *H04W 76/19* (2018.02); *H04W 76/38* (2018.02)

(56) References Cited

OTHER PUBLICATIONS

Summons to attend oral proceedings of the parallel EP application No. 17907392.9 dated Aug. 10, 2022.
The first Office Action of corresponding Japanese application No. 2021-202034, dated Dec. 16, 2022.
The brief communication of corresponding European application No. 17907392.9, dated Dec. 13, 2022.
3GPP TS 36.331 V14.2.2 (Apr. 2017), 3rd Generation Partnership Project, Technical Specification Group Radio Access Network, Evolved Universal Terrestrial Radio Access (E-UTRA), Radio Resource Control (RRC), Protocol specification, (Release 14).
Huawei, Procedure of inter-RAT handover with CN change, R3-162953, 3GPP TSG-RAN WG3 Meeting #94, Reno, Nevada, USA, Nov. 14-18, 2016.
The EESR of corresponding European application No. 23184020.8, dated Jan. 19, 2024.

* cited by examiner

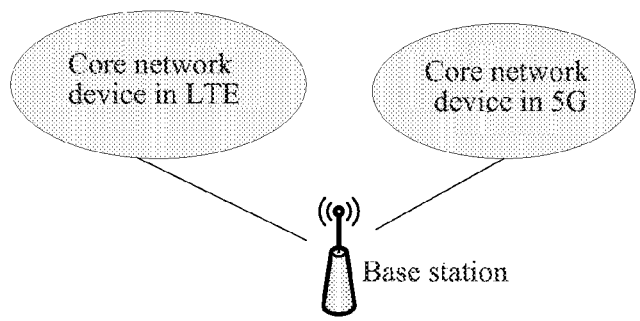

An access network device receives a first message transmitted by a source core network device, where the first message is used for indicating that the source core network device is overloaded ~S110

The access network device performs an operation of migrating a terminal device from the source core network device to a target core network device according to the first message, where the target core network device and the source core network device support different communication systems ~S120

| A source core network device determines a first message, where the first message indicates that the source core network device is overloaded | ∼S410 |

| The source core network device transmits the first message to an access network device, where the access network device is configured to perform an operation of migrating a terminal device from the source core network device to a target core network device according to the first message, where the target core network device and the source core network device support different communication systems | ∼S420 |

| A terminal device receives a second message transmitted by an access network device, where the second message is used for instructing the terminal device to release a first connection and establish, with the access network device, a second connection related to the target core network device, where the first connection is a connection established between the terminal device and the access network device and related to the source core network device, and the target core network device and the source core network device support different communication systems | ∼S510 |

A terminal device receives a fourth message transmitted by an access network device, where the fourth message includes parameters related to a target core network device, where the fourth message is used for instructing the terminal device to reconfigure a first connection according to the parameters, where the first connection is a connection established between the terminal device and the access network device and related to a source core network device, and the target core network device and the source core network device support different communication systems ~ S610

The terminal device receives a sixth message transmitted by an access network device, where the sixth message is used for triggering the terminal device to establish a connection related to a target core network device with the access network device by using a connection re-establishment procedure, so that the terminal device is migrated from the source core network device to the target core network device, and where the target core network device and the source core network device support different communication systems ~ S710

FIG. 8

CONGESTION PROCESSING METHOD AND DEVICE

CROSS-REFERENCE TO RELATED APPLICATIONS

This application is a continuation application of U.S. patent application Ser. No. 16/661,587, filed on Oct. 23, 2019, which is a continuation of International Application No. PCT/CN2017/082479, filed on Apr. 28, 2017. The afore-mentioned patent applications are hereby incorporated by reference in their entireties.

TECHNICAL FIELD

Embodiments of the present application relate to the field of communications and, more particularly, to a congestion processing method and device.

BACKGROUND

In a wireless communication system, a base station can be simultaneously connected to two core network devices. For example, the base station can be simultaneously connected with a core network device in the Long Term Evolution (LTE) system and a core network device in the 5th Generation (5G) system. However, a user equipment can only select one core network device for performing the access when a connection is to be established. If too many terminal devices access the same core network device, a congestion may occur in the core network device.

Therefore, it is desired to provide a congestion processing method to deal with the congestion problem of the core network device, to realize load balancing between core network devices, and thereby improving user experience.

SUMMARY

The present application provides a congestion processing method and device, which can solve the congestion problem of the core network device, realize load balancing between core network devices, and thereby improving user experience.

A first aspect provides a congestion processing method, including: receiving, by an access network device, a first message transmitted by a source core network device, where the first message is used for indicating that the source core network device is overloaded; and performing, by the access network device, an operation of migrating a terminal device from the source core network device to a target core network device according to the first message, where the target core network device and the source core network device support different communication systems.

According to the congestion processing method of the present application, after receiving the first message indicating an overload transmitted by the source core network device, the access network device performs an operation of migrating the terminal device from the source core network device to the target core network device, so that the terminal device can be migrated from the source core network to the target core network, which solves the congestion problem of the source core network device, and can realize load balancing between core network devices, and thereby improving user experience.

With reference to the first aspect, in an implementation manner of the first aspect, the operation of migrating the terminal device from the source core network device to the target core network device includes: transmitting a second message to the terminal device, where the second message is used for instructing the terminal device to release a first connection and establish, with the access network device, a second connection related to the target core network device, where the first connection is a connection established between the terminal device and the access network device and related to the source core network device.

With reference to the first aspect and the foregoing implementation manner, in another implementation manner of the first aspect, the second message includes a first indication information and/or a second indication information, where the first indication information is used for indicating a reason for releasing the first connection, and the second indication information is used for indicating the target core network device.

With reference to the first aspect and the foregoing implementation manners, in another implementation manner of the first aspect, the operation of migrating the terminal device from the source core network device to the target core network device further includes: receiving a third message transmitted by the terminal device, where the third message is used for requesting an establishment of the second connection with the access network device; and establishing the second connection with the terminal device according to the third message.

With reference to the first aspect and the foregoing implementation manners, in another implementation manner of the first aspect, the third message includes the third indication information, where the third indication information is used for indicating that a reason for requesting the establishment of the second connection is that the source core network device is overloaded.

With reference to the first aspect and the foregoing implementation manners, in another implementation manner of the first aspect, the operation of migrating the terminal device from the source core network device to the target core network device includes: transmitting a fourth message to the terminal device, where the fourth message includes parameter(s) related to the target core network, where the fourth message is used for instructing the terminal device to reconfigure a first connection according to the parameter(s), where the first connection is a connection established between the terminal device and the access network device and related to the source core network device.

With reference to the first aspect and the foregoing implementation manners, in another implementation manner of the first aspect, the fourth message includes fourth indication information and/or fifth indication information, where the fourth indication information is used for indicating a reason for reconfiguring the first connection, and the fifth indication information is used for indicating time that the parameter(s) should be used.

With reference to the first aspect and the foregoing implementation manners, in another implementation of the first aspect, the parameter(s) includes/include at least one of the following parameters: parameter(s) related to quality of service QoS, a security key, and parameter(s) related to a network slice to which the target core network device belongs.

With reference to the first aspect and the foregoing implementation manners, in another implementation manner of the first aspect, the operation of migrating the terminal device from the source core network device to the target core network device further includes: transmitting a fifth message to the target core network device, where the fifth message is used for requesting the target core network device to configure the parameter(s), and/or the fifth message is used for requesting an establishment of a bearer with the target core network device.

With reference to the first aspect and the foregoing implementation manners, in another implementation manner of the first aspect, the operation of migrating the terminal device from the source core network device to the target core network device includes:

transmitting a sixth message to the terminal device, where the sixth message is used for triggering the terminal device to establish a connection related to the target core network device with the access network device by using a connection re-establishment procedure.

With reference to the first aspect and the foregoing implementation manners, in another implementation manner of the first aspect, the sixth message includes sixth indication information, where the sixth indication information is used for indicating a reason for establishing the connection.

With reference to the first aspect and the foregoing implementation manners, in another implementation manner of the first aspect, the operation of migrating the terminal device from the source core network device to the target core network device further includes: establishing a bearer with the core network device.

With reference to the first aspect and the foregoing implementation manners, in another implementation manner of the first aspect, after the access network device establishing a bearer with the target core network device, the method further includes: transmitting, by the access network device, a seventh message to the target core network device, where the seventh message is used for indicating data that is finally received by the access network device.

With reference to the first aspect and the foregoing implementation manners, in another implementation manner of the first aspect, the method further includes: transmitting, by the access network device, an eighth message to the source core network device, where the eighth message is used for indicating that the terminal device has been migrated from the source core network device to the target core network device.

A second aspect provides a congestion processing method, including: determining, by a source core network device, a first message, where the first message indicates that the source core network device is overloaded; and transmitting, by the source core network device, the first message to an access network device, where the access network device is used to perform an operation of migrating a terminal device from the source core network device to a target core network device according to the first message, where the target core network device and the source core network device support different communication systems.

According to the congestion processing method of the embodiment of the present application, when a source core network device determines that it is overloaded, the source core network device transmits a first message indicating an overload to an access network device, so that the access network device performs an operation of migrating the a terminal device from the source core network device to a target core network device according to the first message, enabling the terminal device to be migrated from the source core network device to the target core network device, which solves the congestion problem of the source core network, and realizes load balancing between core network devices, and thereby improving user experience.

With reference to the second aspect, in an implementation manner of the second aspect, the method further includes: transmitting, by the source core network device, a ninth message to the target core network device, where the ninth message is used for indicating data that is finally transmitted by the source core network device to the access network device.

With reference to the second aspect and the foregoing implementation manners, in an implementation manner of the second aspect, the method further includes: receiving, by the source core network device, an eighth message transmitted by the access network device, where the eighth message is used for indicating that the terminal device has been migrated from the source core network device to the target core network device.

A third aspect provides a congestion processing method, including: receiving, by the terminal device, a second message transmitted by an access network device, where the second message is used for instructing the terminal device to release a first connection and establish, with the access network device, a second connection related to the target core network device, where the first connection is a connection established between the terminal device and the access network device and related to the source core network device, and the target core network device and the source core network device support different communication systems.

According to the congestion processing method of the present application, the terminal device receives a second message transmitted by an access network device, where the second message is used for instructing the terminal device to release a first connection and establish, with the access network device, a second connection related to the target core network device, where the first connection is a connection established between the terminal device and the access network device and related to the source core network device, enabling the terminal device to be migrated from the source core network device to the target core network device, which solves the congestion problem of the source core network device, realizes load balancing between core network devices, and thereby improving user experience.

With reference to the third aspect, in an implementation manner of the third aspect, the second message includes first indication information and/or second indication information, where the first indication information is used for indicating a reason for releasing the first connection, and the second indication information is used for indicating the target core network device.

With the third aspect and the foregoing implementation manners, in another implementation manner of the third aspect, the method further includes: releasing, by the terminal device, the first connection according to the second message; and transmitting, by the terminal device, a third message to the access network device, where the third message is used for requesting an establishment of the second connection with the access network device.

With reference to the third aspect and the foregoing implementation manners, in another implementation manner of the third aspect, the third message includes third indication information, where the third indication information is used for indicating that a reason for requesting the establishment of the second connection is that the source core network device is overloaded A fourth aspect provides a congestion processing method, including: receiving, by a terminal device, a fourth message transmitted by an access network device, where the fourth message includes parameter(s) related to a target core network device, where the fourth message is used for instructing the terminal device to reconfigure a first connection according to the parameter(s), where the first connection is a connection established between the terminal device and the access network device and related to a source core network device, and the target core network device and the source core network device support different communication systems.

According to the congestion processing method of the present application, a terminal device receives a fourth message transmitted by an access network device, where the fourth message is used for instructing the terminal device to reconfigure, according to parameter(s) related to a target core network device, a first connection related to a source core network device, enabling the terminal device to be migrated from the source core network device to the target core network device, which solves the congestion problem of the source core network device, realizes load balancing between core network devices, and thereby improving user experience.

With reference to the fourth aspect, in an implementation manner of the fourth aspect, the fourth message includes fourth indication information and/or fifth indication information, where the fourth indication information is used for indicating a reason for reconfiguring the first connection, and the fifth indication information is used for indicating time that the parameter(s) should be used.

With reference to the fourth aspect and the foregoing implementation manners, in another implementation manner of the fourth aspect, the parameter(s) includes/include at least one of the following parameters: parameter(s) related to quality of service QoS, a security key, and parameter(s) related to a network slice to which the target core network device belongs.

With reference to the fourth aspect and the foregoing implementation manners, in another implementation manner of the fourth aspect, the method further includes: reconfiguring, by the terminal device, the first connection according to the parameter(s).

With reference to the fourth aspect and the foregoing implementation manners, in another implementation manner of the fourth aspect, in the case that the fourth message includes the fifth indication information, the reconfiguring, by the terminal device, the first connection according to the parameter(s) includes/include: reconfiguring, by the terminal device, the first connection according to the parameter(s) after the time that the parameter(s) should be used.

A fifth aspect provides a congestion processing method, including: receiving, by a terminal device, a sixth message transmitted by an access network device, where the sixth message is used for triggering the terminal device to establish a connection related to a target core network device with the access network device by using a connection re-establishment procedure, so that the terminal device is migrated from the source core network device to the target core network device, and where the target core network device and the source core network device support different communication systems.

According to the congestion processing method of the present application, a terminal device receives a sixth message transmitted by an access network device, where the sixth message is used for triggering the terminal device to establish a connection related to a target core network device with the access network device by using a connection re-establishment procedure, enabling the terminal device to be migrated from the source core network device to the target core network device, which solves the congestion problem of the source core network device, realizes load balancing between core network devices, and thereby improving user experience.

With reference to the fifth aspect, in an implementation manner of the fifth aspect, the sixth message includes sixth indication information, where the sixth indication information is used for indicating a reason for establishing the connection.

With reference to the fifth aspect and the foregoing implementation manners, in an implementation manner of the fifth aspect, the method further includes: initiating, by the terminal device, a connection re-establishment procedure according to the sixth message, and establishes the connection with the access network device.

A sixth aspect provides an access network device for performing the method according to the first aspect or any of the possible implementation manners of the first aspect described above. Specifically, the access network device includes functional modules for performing the method according to the first aspect or any of the possible implementation manners of the first aspect described above.

A seventh aspect provides a core network device for performing the method according to the second aspect or any of the possible implementation manners of the second aspect described above. Specifically, the core network device includes functional modules for performing the method according to the second aspect or any of the possible implementation manners of the second aspect described above.

An eighth aspect provides a terminal device for performing the method according to the third aspect or any of the possible implementation manners of the third aspect described above. Specifically, the terminal device includes functional modules for performing the method according to the third aspect or any of the possible implementation manners of the third aspect described above.

A ninth aspect provides a terminal device for performing the method according to the fourth aspect or any of the possible implementation manners of the fourth aspect described above. Specifically, the terminal device includes functional modules for performing the method according to the fourth aspect or any of the possible implementation manners of the fourth aspect described above.

A tenth aspect provides a terminal device for performing the method according to the fifth aspect or any of the possible implementation manners of the fifth aspect described above. Specifically, the terminal device includes functional modules for performing the method according to the fifth aspect or any of the possible implementation manners of the fifth aspect described above.

An eleventh aspect provides an access network device, including a processor, a memory, and a transceiver. The processor, the memory, and the transceiver communicate with each other, transmit control and/or data signals to each other through an internal connection path such that the access network device performs the method according to the first aspect or any of the possible implementation manners of the first aspect described above.

A twelfth aspect provides a core network device, including a processor, a memory, and a transceiver. The processor, the memory, and the transceiver communicate with each other, transmit control and/or data signals to each other through an internal connection path such that the core network device performs the method according to the second aspect or any of the possible implementation manners of the second aspect described above.

A thirteenth aspect provides a terminal device, including a processor, a memory, and a transceiver. The processor, the memory, and the transceiver communicate with each other, transmit control and/or data signals to each other through an internal connection path such that the terminal device performs the method according to the third aspect or any of the possible implementation manners of the third aspect described above.

A fourteenth aspect provides a terminal device, including a processor, a memory, and a transceiver. The processor, the memory, and the transceiver communicate with each other, transmit control and/or data signals to each other through an internal connection path such that the terminal device performs the method according to the fourth aspect or any of the possible implementation manners of the fourth aspect described above.

A fifteenth aspect provides a terminal device, including a processor, a memory, and a transceiver. The processor, the memory, and the transceiver communicate with each other, transmit control and/or data signals to each other through an internal connection path such that the terminal device performs the method according to the fifth aspect or any of the possible implementation manners of the fifth aspect described above.

A sixteenth aspect provides a computer readable medium for storing a computer program, where the computer program including instructions for performing the first aspect or any of the possible implementation manners of the first aspect described above.

A seventeenth aspect provides a computer readable medium for storing a computer program, where the computer program including instructions for performing the second aspect or any of the possible implementation manners of the second aspect described above.

An eighteenth aspect provides a computer readable medium for storing a computer program, where the computer program including instructions for performing the third aspect or any of the possible implementation manners of the third aspect described above.

A nineteenth aspect provides a computer readable medium for storing a computer program, where the computer program including instructions for performing the fourth aspect or any of the possible implementation manners of the fourth aspect described above.

A twentieth aspect provides a computer readable medium for storing a computer program, where the computer program including instructions for performing the fifth aspect or any of the possible implementation manners of the fifth aspect described above.

BRIEF DESCRIPTION OF DRAWINGS

FIG. 1 is a schematic diagram of an application scenario of an embodiment of the present application.

FIG. 2 is a schematic flowchart of a congestion processing method according to an embodiment of the present application.

FIG. 5 is a schematic flowchart of a congestion processing method according to yet another embodiment of the present application.

FIG. 6 is a schematic flowchart of a congestion processing method according to yet another embodiment of the present application.

FIG. 7 is a schematic flowchart of a congestion processing method according to yet another embodiment of the present application.

FIG. 8 is a schematic flowchart of a congestion processing method according to yet another embodiment of the present application.

DESCRIPTION OF EMBODIMENTS

Figure 3:
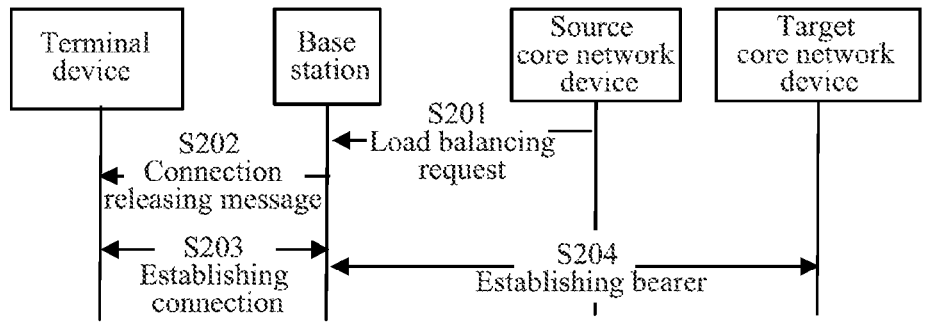
FIG. 3 is a schematic flowchart of a congestion processing method according to a specific embodiment of the present application.

The technical solutions in embodiments of the present application are described below clearly and completely with reference to the accompanying drawings of the embodiments of the present application.

It should be understood that the technical solutions of the embodiments of the present application can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system, a 5th-Generation (5G) system or a new radio (NR) system.

In the embodiments of the present application, the terminal device may include, but is not limited to, a mobile station (MS), a mobile terminal, a mobile phone, a user equipment (UE), and a handset and a portable equipment, a vehicle, etc., where the terminal device can communicate with one or more core networks via a radio access network (RAN), for example, the terminal device may be a mobile phone (or as known as "cellular" phone), a computer with wireless communication capabilities, etc., and the terminal devices may also be a portable, pocket-sized, handheld, computer-integrated or in-vehicle mobile apparatus.

An access network device involved in embodiments of the present application is an apparatus deployed in a wireless access network to provide a wireless communication function for a terminal device. The access network device may be a base station, where the base station may include various forms of macro base stations, micro base stations, relay stations, access points, etc. In systems with different radio access technologies, the names of devices with base station functionality may vary. For example, in an LTE network, an Evolved NodeB (eNB or eNodeB) is called, and a Node B is called in a 3rd Generation (3G) network, etc.

A core network device involved in embodiments of the present application is an apparatus deployed in a core network to provide a wireless communication function for a terminal device. The core network device may be a mobile management entity (MME).

FIG. 1 is a schematic diagram of an application scenario according to an embodiment of the present application. As shown in FIG. 1, the base station is simultaneously connected to core network devices (a core network device in LTE and a core network device in 5G) in two communication systems. When the terminal device needs to establish a connection, the terminal device selects one of the core network devices for performing the access. When one of the two core network devices has congestion, the terminal device on the core network device needs to be migrated to another core network device to implement load balancing between the core network devices.

The present disclosure provides a congestion processing method, which can solve the congestion problem of the core network device in the above scenario, implement load balancing between the core network devices, and thereby improving user experience.

A congestion processing method according to an embodiment of the present application will be described in detail below. FIG. 2 illustrates a congestion processing method in accordance with an embodiment of the present application. As shown in FIG. 2, the method 100 includes:

S110, An access network device receives a first message transmitted by a source core network device, where the first message is used for indicating that the source core network device is overloaded.

S120, The access network device performs an operation of migrating a terminal device from the source core network device to a target core network device according to the first message, where the target core network device and the source core network device support different communication systems.

In an embodiment, in S110, the first message carries the identifier of the source core network device, and after receiving the first message, the access network device determines, according to the identifier in the first message, that the congestion is occurred in the source core network device. Additionally, the first message may further include reason indication information, where the reason indication information is used for indicating that the congestion is caused by what reason or what service.

In an embodiment, in S110, the first message carries a load value of the source core network device, and the access network device determines that the source core network is overloaded according to the load value of the source core network device.

In an embodiment, in S120, before the access network device performs the operation of migrating the terminal device from the source core network device to the target core network device according to the first message, the access network device needs to determine the target core network device and the terminal device.

As an example, the first message carries an identifier of the target core network device, and the access network device determines the target core network device according to the identifier in the first message. Alternatively, when the terminal device establishes a connection with the access network device, the terminal device reports a type of a core network device that the terminal device can access to and/or an identifier of the core network device to the access network device, and the access network device determines the target core network device according to the information reported by the terminal device. Alternatively, the access network device determines the target core network device according to a capability that the terminal device supports a core network device as well as the current service.

As an example, when determining a terminal device that needs to be migrated, the access network device may determine according to a capability that the terminal device supports a core network device. For example, assume that the source core network device is a core network device in an LTE communication system, and the target core network device is a core network device in a 5G communication system. If a terminal device only supports core network devices in the LTE communication system, it is inconvenient for the terminal device to migrate from the source core network to the target core network device. If a terminal device supports both the core network device in the LTE communication system and the core network device in the 5G communication system, the terminal device may be migrated from the source core network device to the target core network device to reduce the load of the source core network device.

Further, if a terminal device supports both the source core network device and the target core network device, the access network device may determine whether to migrate the terminal device according to the current service of the terminal device. For example, if the current service of the terminal device is only supported by the source core network device, it is inconvenient for the terminal device to be switched from the source core network to the target core network. If the current service of the terminal device is supported by both of the source core network device and the target core network device, the terminal device may be migrated from the source core network device to the target core network device to reduce the load of the source core network device.

In the embodiment of the present application, the access network device may migrate the terminal device from the source core network device to the target core network device by using the following several manners.

Manner 1:

The access network device transmits a second message to the terminal device, where the second message is used for instructing the terminal device to release a first connection and establish, with the access network device, a second connection related to the target core network device, where the first connection is a connection established between the terminal device and the access network device and related to the source core network device.

In an embodiment, the second message includes first indication information and/or second indication information, where the first indication information indicates a reason for releasing the first connection, and the second indication information indicates the target core network device. And the second indication information may be, for example, an identity of the target core network device or a type of the target core network device.

Correspondingly, after receiving the second message, the terminal device releases the first connection according to the second message, and transmits a third message for requesting an establishment of a second connection with the access network device to the access network device.

Further, the third message includes third indication information, where the third indication information is used for indicating that a reason for requesting the establishment of the second connection is that the source core network device is overloaded.

Further, after the access network device establishes the second connection with the terminal device, the access network device establishes a bearer with the target core network device.

Manner 2:

The access network device transmits a fourth message to the terminal device, where the fourth message includes parameter(s) related to the target core network, where the fourth message is used for instructing the terminal device to reconfigure a first connection according to the parameter(s), where the first connection is a connection established between the terminal device and the access network device and related to the source core network device.

As an example, the fourth message includes fourth indication information and/or fifth indication information, where the fourth indication information is used for indicating a reason for reconfiguring the first connection, and the fifth indication information is used for indicating time that the parameter(s) should be used.

Correspondingly, after receiving the fourth message, the terminal device reconfigures the first connection according to the fourth message. Further, if the fourth message includes the fifth indication information, the terminal device reconfigures the first connection according to the fourth message after the time that the parameter(s) should be used.

Specifically, in some embodiments, the access network device may indicate, by using the fifth indication information, that the parameter(s) should be used after a first duration starting from a time point that the terminal device receives the fourth message. Then, the terminal device starts a timer when receiving the fourth message, and a timing duration of the timer is the first duration. When the timer expires, the terminal device considers that the parameter(s) starts/start to be used, and reconfigures the first connection according to the parameter(s). Alternatively, the terminal device starts the timer when the fourth message is received, and the timing duration of the timer is the first duration. When the timer expires, the terminal device considers that the parameter(s) starts/start to be used, and configures the first connection according to the parameter(s).

In an embodiment, before transmitting the fourth message to the terminal device, the access network device may transmit a fifth message to the target core network device, where the fifth message is used for requesting the target core network device to configure the parameter(s), and/or the fifth message is used for requesting an establishment of a bearer with the target core network device. Alternatively, the access network device may transmit the fifth message to the target core network device after transmitting the fourth message to the terminal device. After receiving the fifth message, the target access network device configures the parameter(s) for the terminal device and/or establishes a bearer with the access network device.

After the access network device establishes the connection with the terminal device, and establishes bearer with the target core network device, the access network device transmits a seventh message to the target core network device, where the seventh message is used for indicating data that is finally received by the access network device. And/or the access network device transmits an eighth message to the source core network device, where the eighth message is used for indicating that the terminal device has been migrated from the source core network device to the target core network device.

In an embodiment, the seventh message includes data finally received by the access network device. Or the seventh message includes related information of data finally received by the access network device, where the related information may be, for example, an identifier of data packet. After receiving the seventh message, the target core network device may determine, according to the seventh message, data that the source core network device has transmitted to the access network device.

In the above embodiment, the parameter(s) includes/include at least one of the following parameters: parameter(s) related to quality of service (QoS), a security key, and parameter(s) related to a network slice to which the target core network device belongs.

Manner 3:

The access network device transmits a sixth message to the terminal device, where the sixth message is used for triggering the terminal device to establish a connection related to the target core network device with the access network device by using a connection re-establishment procedure, so that the terminal device is migrated from the source core network device to the target core network device.

Correspondingly, after receiving the sixth message, the terminal device initiates a connection re-establishment procedure according to the sixth message, and establishes a connection with the access network device.

It should be noted that the connection re-establishment procedure described in the embodiment of the present application is the same as the corresponding procedure in the prior art. The difference is that the connection re-establishment procedure in the embodiment of the present application is triggered by the access network device.

In an embodiment, before transmitting the sixth message to the terminal device, the access network device may transmit a fifth message to the target core network device, where the fifth message is used for requesting the target core network device to configure parameter(s) related to the target core network device, and/or the fifth message is used for requesting an establishment of a bearer with the target core network device. Alternatively, the access network device may transmit the fifth message to the target core network device after transmitting the sixth message to the terminal device. After receiving the fifth message, the target access network device configures the parameter(s) for the terminal device and/or establishes a bearer with the access network device.

After the access network device establishes the connection with the terminal device, and establishes bearer with the target core network device, the access network device transmits a seventh message to the target core network device, where the seventh message is used for indicating data that is finally received by the access network device. Alternatively, the access network device transmits an eighth message to the source core network device, where the eighth message is used for indicating that the terminal device has been migrated from the source core network device to the target core network device.

In an embodiment, the seventh message includes data finally received by the access network device. Alternatively, the seventh message includes related information of data finally received by the access network device, where the related information may be, for example, an identifier of data packet. After receiving the seventh message, the target core network device may determine, according to the seventh message, data that the source core network device has sent to the access network device.

FIG. 3 is a schematic flowchart of a congestion processing method according to a specific embodiment of the present application. The method 200 corresponds to the manner 1 of the method 100. To avoid repetition, the related description is omitted appropriately. As shown in FIG. 3, the method 200 includes:

S201, A source core network device determines an overload, and the source core network device transmits a load balancing request to a base station.

S202, The base station transmits a connection releasing message to the terminal device.

The connection releasing message may carry a reason for the releasing, where the reason is because the source core network device is overloaded. Meanwhile, the connection releasing message instructs the terminal device to initiate a connection establishment procedure according to a manner of the target core network.

S203, The terminal device establishes a connection with the base station.

S204, The base station establishes a bearer with a target core network device.

Figure 4:
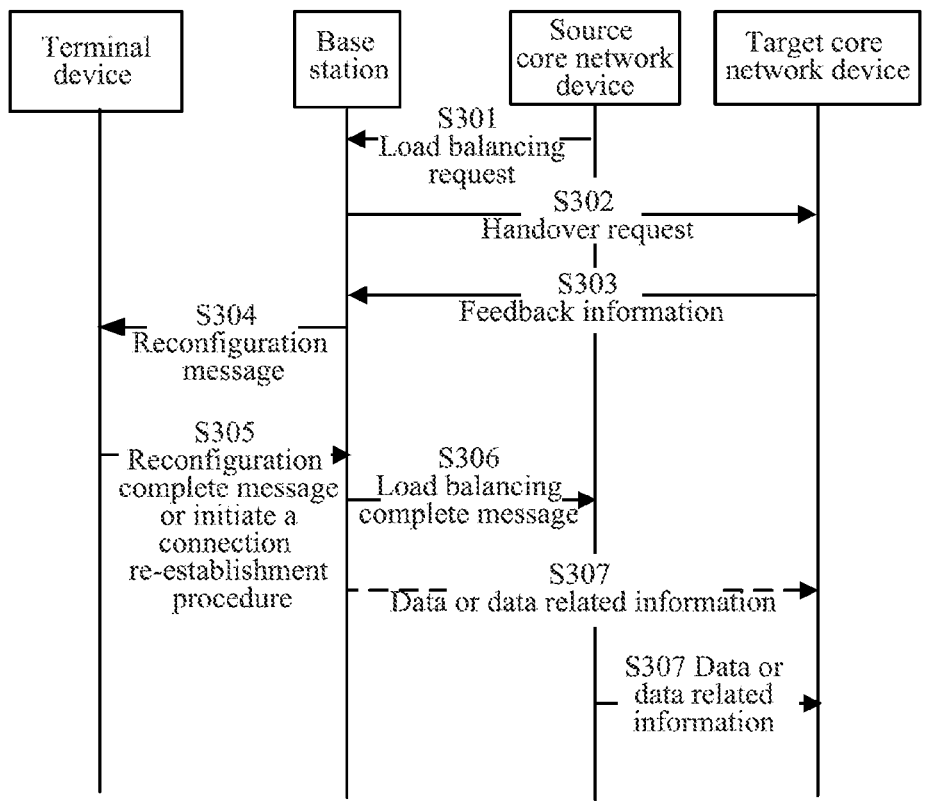
FIG. 4 is a schematic flowchart of a congestion processing method according to another specific embodiment of the present application.

FIG. 4 is a congestion processing method according to another specific embodiment of the present application. The method 300 shown in FIG. 4 corresponds to the manner 2 and the manner 1 of the method 100. In order to avoid repetition, the related description is omitted appropriately. As shown in FIG. 4, method 300 includes:

S301, A source core network device determines an overload, and the source core network device transmits a load balancing request to a base station.

S302, The base station transmits a handover request to a target core network device.

In S302, the handover request is used for requesting the target core network device to configure parameter(s) related to the target core network device for the terminal device, and/or the handover request is used for requesting an establishment of a bearer with the target core network device.

S303. The target core network device transmits feedback information to the base station.

In S303, the feedback information is used to feed back the parameter(s) related to the target core network device, and bearer establishment information.

S304. The base station transmits a reconfiguration message to the terminal device.

In an embodiment, the reconfiguration message includes reconfiguration reason information and/or time that the parameter(s) should be used. The reconfiguration reason information indicates that the reconfiguration reason is that the source core network device is overloaded, and the time that the parameter(s) should be used is used for indicating time that the parameter(s) related to the target core network device should be used.

S305. The terminal device transmits a reconfiguration complete message or initiates a connection re-establishment procedure to the base station.

S306. The base station transmits a load balancing complete message to the source core network.

S307. If there is an interface between the core network devices, the source core network device transmits data or data related information that was finally transmitted to the base station to the target core network device. If there is no interface between the access network devices, the base station transmits data or data related information that was finally received to the target core network device.

A congestion processing method according to an embodiment of the present application will be described in detail below from the perspective of a source core network device with reference to FIG. 5. It should be understood that interactions among a source core network device, a target core network device, an access network device, and the terminal device described on the side of the source core network device is the same as those on the side of the access network device. To avoid repetition, the related description is omitted as appropriate. As shown in FIG. 5, method 400 includes:

S410: A source core network device determines a first message, where the first message indicates that the source core network device is overloaded.

S420: The source core network device transmits the first message to an access network device, where the access network device is configured to perform an operation of migrating a terminal device from the source core network device to a target core network device according to the first message, where the target core network device and the source core network device support different communication systems.

Therefore, according to the congestion processing method in the embodiment of the present application, the source core network device transmits a first message indicating an overload to the access network device when determining that the source core network is overloaded, so that the access network device performs an operation of migrating the terminal device from the source core network device to the target core network device according to the first message, enabling the terminal device to be migrated from the source core network device to the target core network device, which solves the congestion problem of the source core network, realizes load balancing between core network devices, and thereby improving user experience.

In the embodiment of the present application, the method further includes: the source core network device transmits a ninth message to the target core network device, where the ninth message is used for indicating data that is finally transmitted by the source core network device to the access network device.

In an embodiment of the present application, the method further includes: the source core network device receives an eighth message transmitted by the access network device, where the eighth message is used for indicating that the terminal device has been migrated from the source core network device to the target core network device.

A congestion processing method according to an embodiment of the present application will be described in detail from the perspective of a terminal device with reference to FIGS. 6-8.

FIG. 6 illustrates a congestion processing method according to yet another embodiment of the present application. As shown in FIG. 6, method 500 includes:

S510: A terminal device receives a second message transmitted by an access network device, where the second message is used for instructing the terminal device to release a first connection and establish, with the access network device, a second connection related to the target core network device, where the first connection is a connection established between the terminal device and the access network device and related to the source core network device, and the target core network device and the source core network device support different communication systems.

Therefore, according to the congestion processing method in the embodiment of the present application, the terminal device receives a second message transmitted by an access network device, where the second message is used for instructing the terminal device to release a first connection and establish, with the access network device, a second connection related to the target core network device, where the first connection is a connection established between the terminal device and the access network device and related to the source core network device. Therefore, enabling the terminal device to be migrated from the source core network device to the target core network device, which solves the congestion problem of the source core network device, realizes load balancing between core network devices, and thereby improving user experience.

In the embodiment of the present application, the second message includes first indication information and/or second indication information, where the first indication information is used for indicating a reason for releasing the first connection, and the second indication information is used for indicating the target core network device.

In the embodiment of the present application, the method further includes: the terminal device releases the first connection according to the second message; and the terminal device transmits a third message to the access network device, where the third message is used for requesting an establishment of the second connection with the access network device.

In the embodiment of the present application, the third message includes third indication information, where the third indication information is used for indicating that a reason for requesting the establishment of the second connection is that the source core network device is overloaded.

FIG. 7 illustrates a congestion processing method according to yet another embodiment of the present application. As shown in FIG. 7, method 600 includes:

S610: A terminal device receives a fourth message transmitted by an access network device, where the fourth message includes parameter(s) related to a target core network device, where the fourth message is used for instructing the terminal device to reconfigure a first connection according to the parameter(s), where the first connection is a connection established between the terminal device and the access network device and related to a source core network device, and the target core network device and the source core network device support different communication systems.

Therefore, according to the congestion processing method in the embodiment of the present application, a terminal device receives a fourth message transmitted by an access network device, where the fourth message is used for instructing the terminal device to reconfigure, according to parameter(s) related to a target core network device, a first connection related to a source core network device. Therefore, enabling the terminal device to be migrated from the source core network device to the target core network device, which solves the congestion problem of the source core network device, realizes load balancing between core network devices, and thereby improving user experience.

In the embodiment of the present application, the fourth message includes fourth indication information and/or fifth indication information, where the fourth indication information is used for indicating a reason for reconfiguring the first connection, and the fifth indication information is used for indicating time that the parameter(s) should be used.

In an embodiment of the present application, the parameter(s) includes/include at least one of the following parameters: parameter(s) related to the quality of service (QoS), a security key, and parameter(s) related to a network slice to which the target core network device belongs.

In an embodiment of the present application, the method further includes: the terminal device reconfigures the first connection according to the parameter(s).

In the embodiment of the present application, in the case that the fourth message includes the fifth indication information, the reconfiguring, by the terminal device, the first connection according to the parameter(s) includes/include: the terminal device reconfigures the first connection according to the parameter(s) after the time that the parameter(s) should be used.

FIG. 8 illustrates a congestion processing method according to still another embodiment of the present application. As shown in FIG. 8, method 700 includes:

S710: The terminal device receives a sixth message transmitted by an access network device, where the sixth message is used for triggering the terminal device to establish a connection related to a target core network device with the access network device by using a connection re-establishment procedure, so that the terminal device is migrated from the source core network device to the target core network device, and where the target core network device and the source core network device support different communication systems.

Therefore, according to the congestion processing method of the present application, a terminal device receives a sixth message transmitted by an access network device, where the sixth message is used for triggering the terminal device to establish a connection related to a target core network device with the access network device by using a connection re-establishment procedure. Therefore, enabling the terminal device to be migrated from the source core network device to the target core network device, which solves the congestion problem of the source core network device, realizes load balancing between core network devices, and thereby improving user experience.

In the embodiment of the present application, the sixth message includes sixth indication information, where the sixth indication information is used for indicating a reason for establishing the connection.

In the embodiment of the present application, the method further includes: the terminal device initiates a connection re-establishment procedure according to the sixth message, and establishes the connection with the access network device.

Figure 9:
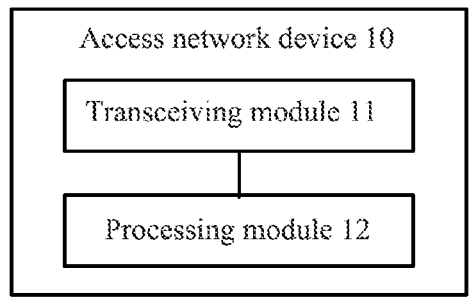
FIG. 9 is a schematic block diagram of an access network device according to an embodiment of the present application.

The congestion processing method according to the embodiment of the present application has been described in detail with reference to FIG. 2 to FIG. 8. The access network device according to an embodiment of the present application will be described in detail below with reference to FIG. 9. As shown in FIG. 9, an access network device 10 includes:
a transceiving module 11, configured to a first message transmitted by a source core network device, where the first message is used for indicating that the source core network device is overloaded; and
a processing module 12, configured to perform an operation of migrating a terminal device from the source core network device to a target core network device according to the first message, where the target core network device and the source core network device support different communication systems.

Therefore, after the access network device according to the embodiment of the present application receives the first message indicating an overload transmitted by the source core network device, the access network device performs an operation of migrating the terminal device from the source core network device to the target core network device, enabling the terminal device to be migrated from the source core network to the target core network, which solves the congestion problem of the source core network device, realizes load balancing between core network devices, and thereby improving user experience.

In the embodiment of the present application, the operation of migrating the terminal device from the source core network device to the target core network device includes: controlling the transceiving module to transmit a second message to the terminal device, where the second message is used for instructing the terminal device to release a first connection and establish, with the access network device, a second connection related to the target core network device, where the first connection is a connection established between the terminal device and the access network device and related to the source core network device.

In the embodiment of the present application, the second message includes a first indication information and/or a second indication information, where the first indication information is used for indicating a reason for releasing the first connection, and the second indication information is used for indicating the target core network device.

In the embodiment of the present application, the operation of migrating the terminal device from the source core network device to the target core network device further includes: controlling the transceiving module to receive a third message transmitted by the terminal device, where the third message is used for requesting an establishment of the second connection with the access network device; and establish the second connection with the terminal device according to the third message.

In the embodiment of the present application, the third message includes third indication information, where the third indication information is used for indicating that a reason for requesting the establishment of the second connection is that the source core network device is overloaded.

In the embodiment of the present application, the operation of migrating the terminal device from the source core network device to the target core network device includes: controlling the transceiving module to transmit a fourth message to the terminal device, where the fourth message includes parameter(s) related to the target core network, where the fourth message is used for instructing the terminal device to reconfigure a first connection according to the parameter(s), where the first connection is a connection established between the terminal device and the access network device and related to the source core network device.

In the embodiment of the present application, the fourth message includes fourth indication information and/or fifth indication information, where the fourth indication information is used for indicating a reason for reconfiguring the first connection, and the fifth indication information is used for indicating time that the parameter(s) should be used.

In an embodiment of the present application, the parameter(s) includes/include at least one of the following parameters: parameter(s) related to quality of service QoS, a security key, and parameter(s) related to a network slice to which the target core network device belongs.

In the embodiment of the present application, the operation of migrating the terminal device from the source core network device to the target core network device further includes: controlling the transceiving module to transmit a fifth message to the target core network device, where the fifth message is used for requesting the target core network device to configure the parameter(s), and/or the fifth message is used for requesting an establishment of a bearer with the target core network device.

In the embodiment of the present application, the operation of migrating the terminal device from the source core network device to the target core network device includes: controlling the transceiving module to transmit a sixth message to the terminal device, where the sixth message is used for the terminal device to establish a connection related to the target core network device with the access network device by triggering a connection re-establishment procedure.

In the embodiment of the present application, the sixth message includes sixth indication information, where the sixth indication information is used for indicating a reason for establishing the connection.

In the embodiment of the present application, the operation of migrating the terminal device from the source core network device to the target core network device includes: controlling the access network device to establish a bearer with the core network device.

In the embodiment of the present application, after the access network device establishes a bearer with the target core network device, the transceiving module 11 is further configured to: transmit a seventh message to the target core network device, where the seventh message is used for indicating data that is finally received by the transceiving module.

In the embodiment of the present application, the transceiving module 11 is further configured to: transmit an eighth message to the source core network device, where the eighth message is used for indicating that the terminal device has been migrated from the source core network device to the target core network device.

The access network device according to the embodiment of the present application may refer to the process in the method 100 corresponding to the embodiment of the present application, where respective units/modules in the access network device and the foregoing other operations and/or functions respectively implements a process corresponding to the method 100. For the sake of brevity, those will not be repeated herein.

Figure 10:
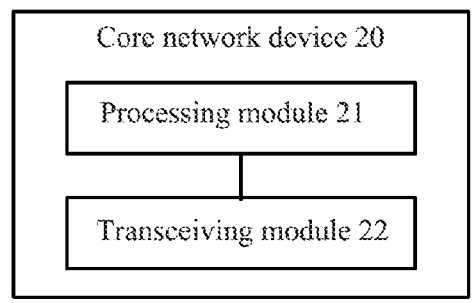
FIG. 10 is a schematic block diagram of a core network device according to an embodiment of the present application.

FIG. 10 shows a core network device according to an embodiment of the present application. As shown in FIG. 10, the core network device 20 includes:

a processing module 21, configured to determine a first message, where the first message indicates that the core network device is overloaded; and a transceiving module 22, configured to transmit the first message to an access network device, where the access network device is configured to perform an operation of migrating a terminal device from the core network device to a target core network device according to the first message, where the target core network device and the core network device support different communication systems.

Therefore, the core network device according to the embodiment of the present application transmits a first message indicating an overload to the access network device when determining that the core network device is overloaded, so that the access network device performs the operation of migrating the terminal device from the core network device to the target core network device according to the first message, enabling the terminal device to be migrated from the core network device to the target core network device, which solves the congestion problem of the core network, realizes load balancing between the core network devices, and thereby improving user experience.

In the embodiment of the present application, the transceiving module 22 is further configured to: transmit a ninth message to the target core network device, where the ninth message is used for indicating data that is finally transmitted by the core network device to the access network device.

In the embodiment of the present application, the transceiving module 22 is further configured to: receive an eighth message transmitted by the access network device, where the eighth message is used for indicating that the terminal device has been migrated from the core network device to the target core network device.

The core network device according to the embodiment of the present application may refer to the process in the method 400 corresponding to the embodiment of the present application, where respective units/modules in the core network device and the foregoing other operations and/or functions respectively implements a corresponding process in the method 400. For the sake of brevity, those will not be repeated herein.

Figure 11:
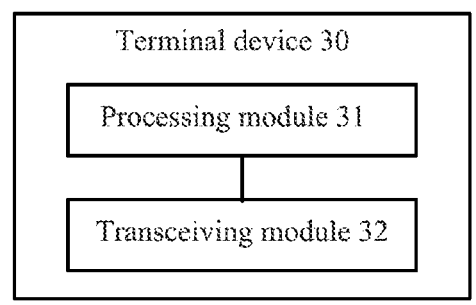
FIG. 11 is a schematic block diagram of a terminal device according to an embodiment of the present application.

FIG. 11 shows a terminal device according to an embodiment of the present application. As shown in FIG. 11, the terminal device 30 includes a processing module 31 and a transceiving module 32:

The processing module 31 is configured to control the transceiving module 32 to receive a second message transmitted by an access network device, where the second message is used for instructing the terminal device to release a first connection and establish, with the access network device, a second connection related to the target core network device, where the first connection is a connection established between the terminal device and the access network device and related to the source core network device, and the target core network device and the source core network device support different communication systems.

Therefore, the terminal device according to the embodiment of the present application receives a second message transmitted by an access network device, where the second message is used for instructing the terminal device to release a first connection and establish, with the access network device, a second connection related to the target core network device, where the first connection is a connection established between the terminal device and the access network device and related to the source core network device. Therefore, enabling the terminal device to be migrated from the source core network device to the target core network device, which solves the congestion problem of the source core network device, realizes load balancing between core network devices, and thereby improving user experience.

In the embodiment of the present application, the second message includes first indication information and/or second indication information, where the first indication information is used for indicating a reason for releasing the first connection, and the second indication information is used for indicating the target core network device.

In the embodiment of the present application, the processing module 31 is further configured to: release the first connection according to the second message; and the transceiving module 32 is further configured to transmit a third message to the access network device, where the third message is used for requesting an establishment of the second connection with the access network device.

In the embodiment of the present application, the third message includes third indication information, where the third indication information is used for indicating that a reason for requesting the establishment of the second connection is that the source core network device is overloaded.

The terminal device according to the embodiment of the present application may refer to the process in the method 500 corresponding to the embodiment of the present application, where respective units/modules in the terminal device and the foregoing other operations and/or functions respectively implements a corresponding process in the method 500. For the sake of brevity, those will not be repeated herein.

Alternatively, the processing module 31 is configured to control the transceiving module 32 to receive a fourth message transmitted by an access network device, where the fourth message includes parameter(s) related to a target core network device, where the fourth message is used for instructing the terminal device to reconfigure a first connection according to the parameter(s), where the first connection is a connection established between the terminal device and the access network device and related to a source core network device, and the target core network device and the source core network device support different communication systems.

Therefore, the terminal device according to the embodiment of the present application receives a fourth message transmitted by an access network device, where the fourth message is used for instructing the terminal device to reconfigure the first connection related to the source core network device according to parameter(s) related to the target core network device. Therefore, enabling the terminal device to be migrated from the source core network device to the target core network device, which solves the congestion problem of the source core network device, realizes load balancing between the core network devices, and thereby improving user experience.

In the embodiment of the present application, the fourth message includes fourth indication information and/or fifth indication information, where the fourth indication information is used for indicating a reason for reconfiguring the first connection, and the fifth indication information is used for indicating time that the parameter(s) should be used.

In an embodiment of the present application, the parameter(s) includes/include at least one of the following parameters: parameter(s) related to quality of service (QoS), a security key, and parameter(s) related to a network slice to which the target core network device belongs.

In the embodiment of the present application, the processing module 31 is further configured to reconfigure the first connection according to the parameter(s).

In the embodiment of the present application, in the case that the fourth message includes the fifth indication information, the processing module 31 is specifically configured to: reconfigure the first connection according to the parameter(s) after the time that the parameter(s) should be used.

The terminal device according to the embodiment of the present application may refer to the process in the method 600 corresponding to the embodiment of the present application, where respective units/modules in the terminal device and the foregoing other operations and/or functions respectively implements a corresponding process in the method 600. For the sake of brevity, those will not be repeated herein.

Alternatively, the processing module 31 is configured to control the transceiving module 32 to receive a sixth message transmitted by an access network device, where the sixth message is used for triggering the terminal device to establish a connection related to a target core network device with the access network device by using a connection re-establishment procedure, so that the terminal device is migrated from the source core network device to the target core network device, and where the target core network device and the source core network device support different communication systems.

Therefore, a terminal device according to the embodiment of the present application receives a sixth message transmitted by an access network device, where the sixth message is used for triggering the terminal device to establish a connection related to a target core network device with the access network device by using a connection re-establishment procedure. Therefore, enabling the terminal device to be migrated from the source core network device to the target core network device, which solves the congestion problem of the source core network device, realizes load balancing between core network devices, and thereby improving user experience.

In the embodiment of the present application, the sixth message includes sixth indication information, where the sixth indication information is used for indicating a reason for establishing the connection.

In the embodiment of the present application, the processing module 31 is further configured to: initiate a connection re-establishment procedure according to the sixth message, so that the terminal device establishes the connection with the access network device.

The terminal device according to the embodiment of the present application may refer to the process in the method 700 corresponding to the embodiment of the present application, where respective units/modules in the terminal device and the foregoing other operations and/or functions respectively implements a corresponding process in the method 700. For the sake of brevity, those will not be repeated herein.

Figure 12:
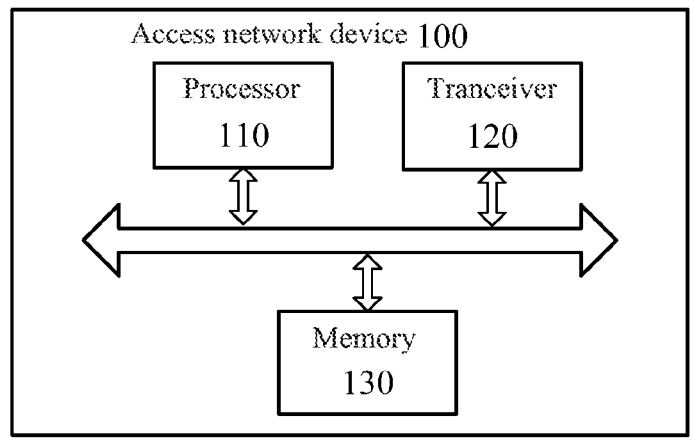
FIG. 12 is a schematic block diagram of an access network device according to another embodiment of the present application.

FIG. 12 illustrates an access network device according to another embodiment of the present application. As shown in FIG. 12, the access network device 100 includes a processor 110 and a transceiver 120, where the processor 110 is connected to the transceiver 120. In an embodiment, the access network device 100 further includes a memory 130, and the memory 130 and the processor 110 are connected. The processor 110, the memory 130, and the transceiver 120 can communicate with each other through an internal connection path. The transceiving module 120 is configured to receive a first message transmitted by a source core network device, where the first message is used for indicating that the source core network device is overloaded; and the processing module 110 is configured to perform an operation of migrating a terminal device from the source core network device to a target core network device according to the first message, where the target core network device and the source core network device support different communication systems.

Therefore, after the access network device according to the embodiment of the present application receives the first message indicating an overload transmitted by the source core network device, the access network device performs an operation of migrating the terminal device from the source core network device to the target core network device, so that the terminal device can be migrated from the source core network to the target core network, which solves the congestion problem of the source core network device, realizes load balancing between core network devices, and thereby improving user experience.

The access network device 100 according to the embodiment of the present application may refer to the access network device 10 corresponding to the embodiment of the present application, where respective units/modules in the access network device and the foregoing other operations and/or functions respectively implements a corresponding process in the method 100. For the sake of brevity, those will not be repeated herein.

Figure 13:
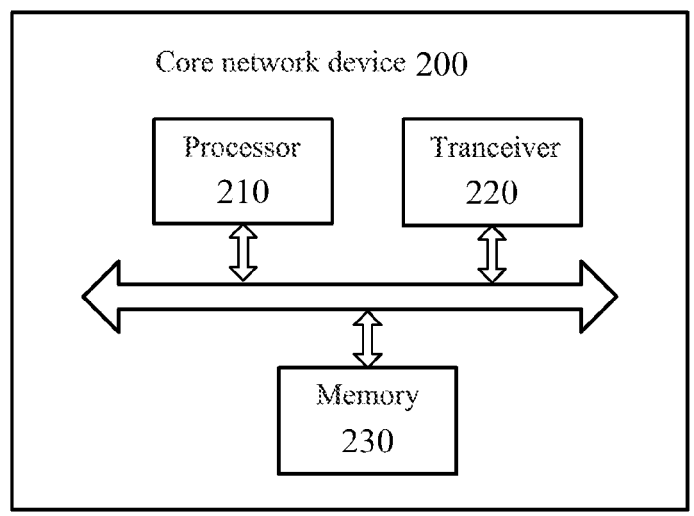
FIG. 13 is a schematic block diagram of a core network device according to another embodiment of the present application.

FIG. 13 illustrates a schematic block diagram of a core network device according to an embodiment of the present application. As shown in FIG. 13, the core network device 200 includes a processor 210 and a transceiver 220. The processor 210 is connected to the transceiver 220. In an embodiment, the core network device 200 further includes a memory 230 that is connected to the processor 210. The processor 210, the memory 230, and the transceiver 220 can communicate with each other through an internal connection path. The transceiver 220 is configured to determine a first message, where the first message indicates that the core network device is overloaded, and the transceiver 220 is configured to transmit the first message to an access network device, where the access network device is configured to perform an operation of migrating a terminal device from the core network device to a target core network device according to the first message, where the target core network device and the core network device support different communication systems.

Therefore, the core network device according to the embodiment of the present application transmits a first message indicating an overload to the access network device when determining that the core network device is overloaded, so that the access network device performs the operation of migrating the terminal device from the core network device to the target core network device according to the first message, enabling the terminal device to be migrated from the core network device to the target core network device, which solves the congestion problem of the core network, realizes load balancing between the core network devices, and thereby improving user experience.

The core network device 200 according to the embodiment of the present application may refer to the core network device 20 corresponding to the embodiment of the present application, where respective units/modules in the core network device and the foregoing other operations and/or functions respectively implements a corresponding process in the method 400. For the sake of brevity, those will not be repeated herein.

Figure 14:
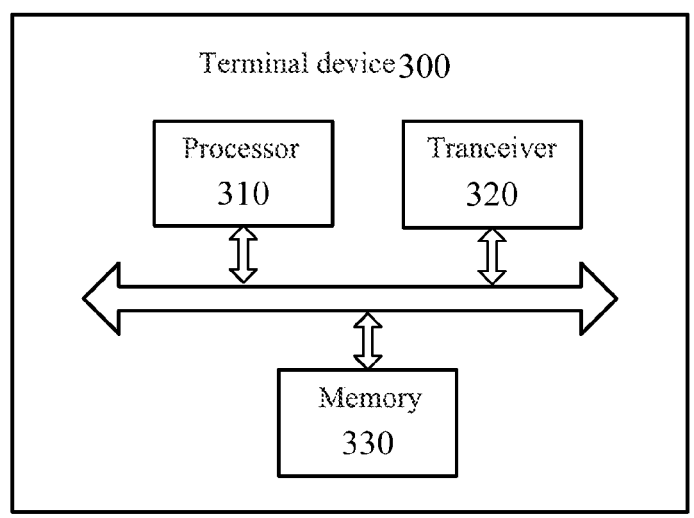
FIG. 14 is a schematic block diagram of a terminal device according to another embodiment of the present application.

FIG. 14 shows a schematic block diagram of a terminal device according to an embodiment of the present application. As shown in FIG. 14, the terminal device 300 includes a processor 310 and a transceiver 320. The processor 310 is connected to the transceiver 320, in an embodiment, the terminal device 300 further includes a memory 330, and the memory 330 is connected to the processor 310. The processor 310, the memory 330, and the transceiver 320 can communicate with each other through an internal connection path. The processor 310 is configured to control the transceiving module 310 to receive a second message transmitted by an access network device, where the second message is used for instructing the terminal device to release a first connection and establish, with the access network device, a second connection related to the target core network device, where the first connection is a connection established between the terminal device and the access network device and related to the source core network device, and the target core network device and the source core network device support different communication systems.

Therefore, the terminal device according to the embodiment of the present application receives a second message transmitted by an access network device, where the second message is used for instructing the terminal device to release a first connection and establish, with the access network device, a second connection related to the target core network device, where the first connection is a connection established between the terminal device and the access network device and related to the source core network device. Therefore, enabling the terminal device to be migrated from the source core network device to the target core network device, which solves the congestion problem of the source core network device, realizes load balancing between core network devices, and thereby improving user experience.

The terminal device 300 according to the embodiment of the present application may refer to the corresponding terminal device 30 of the embodiment of the present application, where respective units/modules in the core network device and the foregoing other operations and/or functions respectively implements a corresponding process in the method 500. For the sake of brevity, those will not be repeated herein.

Alternatively, the processor 310 is configured to control the transceiver 320 to receive a fourth message transmitted by an access network device, where the fourth message includes parameter(s) related to a target core network device, where the fourth message is used for instructing the terminal device to reconfigure a first connection according to the parameter(s), where the first connection is a connection established between the terminal device and the access network device and related to a source core network device, and the target core network device and the source core network device support different communication systems.

Therefore, the terminal device according to the embodiment of the present application receives a fourth message transmitted by an access network device, where the fourth message is used for instructing the terminal device to reconfigure the first connection related to the source core network device according to parameter(s) related to the target core network device. Therefore, enabling the terminal device to be migrated from the source core network device to the target core network device, which solves the congestion problem of the source core network device, realizes load balancing between the core network devices, and thereby improving user experience.

The terminal device 300 according to the embodiment of the present application may refer to the terminal device 30 corresponding to the embodiment of the present application, where respective units/modules in the terminal device and the foregoing other operations and/or functions respectively implements a corresponding process in the method 600. For the sake of brevity, those will not be repeated herein.

Alternatively, the processor 310 is configured to control the transceiver 320 to receive a sixth message transmitted by an access network device, where the sixth message is used for triggering the terminal device to establish a connection related to a target core network device with the access network device by using a connection re-establishment procedure, so that the terminal device is migrated from the source core network device to the target core network device, and where the target core network device and the source core network device support different communication systems.

Therefore, a terminal device according to the embodiment of the present application receives a sixth message transmitted by an access network device, where the sixth message is used for triggering the terminal device to establish a connection related to a target core network device with the access network device by using a connection re-establishment procedure. Therefore, enabling the terminal device to be migrated from the source core network device to the target core network device, which solves the congestion problem of the source core network device, realizes load balancing between core network devices, and thereby improving user experience.

The terminal device 300 according to the embodiment of the present application may refer to the terminal device 30 corresponding to the embodiment of the present application, where respective units/modules in the terminal device and the foregoing other operations and/or functions respectively implements a corresponding process in the method 700. For the sake of brevity, those will not be repeated herein.

It should be understood that the processor of the embodiment of the present application may be an integrated circuit chip with signal processing capability. In a process of implementation, each step of the foregoing method embodiments may be done by an integrated logic circuit of hardware in a processor or an instruction in a form of software. The foregoing processor may be a general purpose processor, a digital signal processor (DSP), an application specific integrated circuit (ASIC), a field programmable gate array (FPGA), or other programming logic device, a discrete gate, or a transistor logic device, a discrete hardware component. Each of methods, steps, and logical block diagrams disclosed in the embodiments of the present application can be implemented or executed. The general purpose processor may be a microprocessor or any conventional processor, etc. The steps of the method disclosed in the embodiments of the present application may be directly embodied as being implemented by a hardware decoding processor, or being implemented by a combination of hardware and software modules in the decoding processor. The software module can be located in a conventional storage medium in the prior art, such as a random access memory, a flash memory, a read only memory, a programmable read only memory or an electrically erasable programmable memory, a register, etc. The storage medium is located in the memory, and the processor reads information in the memory and performs the steps of the foregoing method in conjunction with its hardware.

It should be understood that the memory in the embodiments of the present application may be a volatile memory or a non-volatile memory, or may include both volatile and non-volatile memory. The non-volatile memory may be a read-only memory (ROM), a programmable ROM (PROM), an erasable PROM (EPROM), or an electrically EPROM (EEPROM) or a flash memory. The volatile memory can be a random access memory (RAM) that acts as an external cache. By way of example and not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM)) and direct rambus RAM (DR RAM). It should be noted that the memory according to the systems and method described herein are intended to include, without being limited to, these and any other suitable types of memory.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraints of the technical solutions. Professionals can use different methods for each specific application to implement the described functionality, but this kind of implementation should not be considered beyond the scope of the present application.

A person skilled in the art can clearly understand that for the convenience and brevity of the description, specific working processes of a system, an apparatus and a unit described above can refer to the corresponding processes in the foregoing method embodiments, and details are not described herein again.

In the several embodiments provided by the present application, it should be understood that the disclosed system, apparatus, and method may be implemented in other manners. For example, the apparatus embodiments described above are merely illustrative. For example, the division of the unit is only a logical function division, in actual implementation, there may be another division manner, for example, multiple units or components may be combined or can be integrated into another system, or some features can be omitted or not executed. In addition, the mutual coupling or direct coupling or communication connection shown or discussed may be an indirect coupling or communication connection through some interfaces, apparatuses or units, and may be electrical, mechanical or other forms.

The units described as separate components may or may not be physically separated, and the components displayed as units may or may not be physical units, that is, may be located in one location, or may be distributed to multiple network units. Some or all of the units may be selected according to actual needs to achieve the purpose of the solution of the embodiments.

Furthermore, each functional unit in the embodiments of the present application may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present application, in nature, or a part makes contributions to the prior art, or a part of the technical solution, may be embodied in the form of a software product, where the computer software product is stored in a storage medium, including a plurality of instructions to cause a computer device (which may be a personal computer, a server, or a network device, etc.) to perform all or part of the steps of the method described in the embodiments of the present application. The foregoing storage medium includes various medium that can store program codes, such as, a USB flash disk, a mobile hard disk, a read-only memory (ROM), a random access memory (RAM), a magnetic disk, or an optical disk, etc.

The foregoing description is only specific embodiments of the present application; however, the scope of protection of the present application is not limited thereto, and changes or substitutions that can be readily think of by any person skilled in the art within the technical scope disclosed in the present application shall be covered by the scope of protection of the present application. Therefore, the scope of protection of the present application shall be subject to the scope of protection of the claims.

What is claimed is:

1. A congestion processing method, comprising:
receiving, by an access network device, a first message transmitted by a source core network device, wherein the first message is used for indicating that the source core network device is overloaded; and
transmitting, by the access network device, a second message to a terminal device, wherein the second message is used for instructing the terminal device to release a first connection and establish, with the access network device, a second connection related to a target core network device, wherein the first connection is a connection established between the terminal device and the access network device and related to the source core network device, wherein the target core network device and the source core network device support different communication systems respectively;
wherein the second message comprises second indication information, wherein the second indication information is used for indicating a type of the target core network device;
wherein the source core network device is a core network device in an LTE system, and the target core network device is a core network device in a 5G system; or the target core network device is a core network device in the LTE system, and the source core network device is a core network device in the 5G system.

2. The method according to claim 1, wherein the method further comprises:
receiving a third message transmitted by the terminal device, wherein the third message is used for requesting an establishment of the second connection with the access network device.

3. The method according to claim 2, wherein the third message comprises third indication information, wherein the third indication information is used for indicating that a reason for requesting the establishment of the second connection is that the source core network device is overloaded.

4. The method according to claim 1, wherein the method further comprises:
transmitting, by the access network device, an eighth message to the source core network device, wherein the eighth message is used for indicating that the terminal device has been migrated from the source core network device to the target core network device.

5. The method according to claim 1, wherein the different communication systems comprise Long Term Evolution (LTE) system and 5th Generation (5G) system.

6. The method according to claim 1, wherein the type comprises a core network device in LTE or a core network device in 5G.

7. The method according to claim 1, wherein the method further comprises receiving, by the access network device, a reconfiguration complete message transmitted by the terminal device.

8. A congestion processing method, comprising:
receiving, by a terminal device, a second message transmitted by an access network device, wherein the second message is used for instructing the terminal device to release a first connection and establish, with the access network device, a second connection related to a target core network device, wherein the first connection is a connection established between the terminal device and the access network device and related to a source core network device, wherein the target core network device and the source core network device support different communication systems respectively;
wherein the second message comprises second indication information, wherein the second indication information is used for indicating a type of the target core network device;
wherein the source core network device is a core network device in an LTE system, and the target core network device is a core network device in a 5G system; or the target core network device is a core network device in the LTE system, and the source core network device is a core network device in the 5G system.

9. The method according to claim 8, wherein the method further comprises:
   releasing, by the terminal device, the first connection according to the second message; and
   transmitting, by the terminal device, a third message to the access network device, wherein the third message is used for requesting an establishment of the second connection with the access network device.

10. The method according to claim 9, wherein the third message comprises third indication information, wherein the third indication information is used for indicating that a reason for requesting the establishment of the second connection is that the source core network device is overloaded.

11. An access network device, comprising a processor, and a transceiver:
   the processor is configured to control the transceiver to receive a first message transmitted by a source core network device, wherein the first message is used for indicating that the source core network device is overloaded; and
   the processor is configured to control the transceiver to transmit a second message to a terminal device, wherein the second message is used for instructing the terminal device to release a first connection and establish, with the access network device, a second connection related to a target core network device, wherein the first connection is a connection established between the terminal device and the access network device and related to the source core network device, wherein the target core network device and the source core network device support different communication systems respectively;
   wherein the second message comprises second indication information, wherein the second indication information is used for indicating a type of the target core network device;
   wherein the source core network device is a core network device in an LTE system, and the target core network device is a core network device in a 5G system; or the target core network device is a core network device in the LTE system, and the source core network device is a core network device in the 5G system.

12. The access network device according to claim 11, wherein the processor is configured to control the transceiver to:
   receive a third message transmitted by the terminal device, wherein the third message is used for requesting an establishment of the second connection with the access network device.

13. A terminal device, comprising a processor and a transceiver, wherein:
   the processor is configured to control the transceiver to receive a second message transmitted by an access network device, wherein the second message is used for instructing the terminal device to release a first connection and establish, with the access network device, a second connection related to a target core network device, wherein the first connection is a connection established between the terminal device and the access network device and related to a source core network device, wherein the target core network device and the source core network device support different communication systems respectively;
   wherein the second message comprises second indication information, wherein the second indication information is used for indicating a type of the target core network device;
   wherein the source core network device is a core network device in an LTE system and the target core network device is a core network device in a 5G system; or the target core network device is a core network device in the LTE system, and the source core network device is a core network device in the 5G system.

* * * * *